June 16, 1953   R. F. WILD   2,641,931
TEMPERATURE MEASURING APPARATUS
Filed July 27, 1949
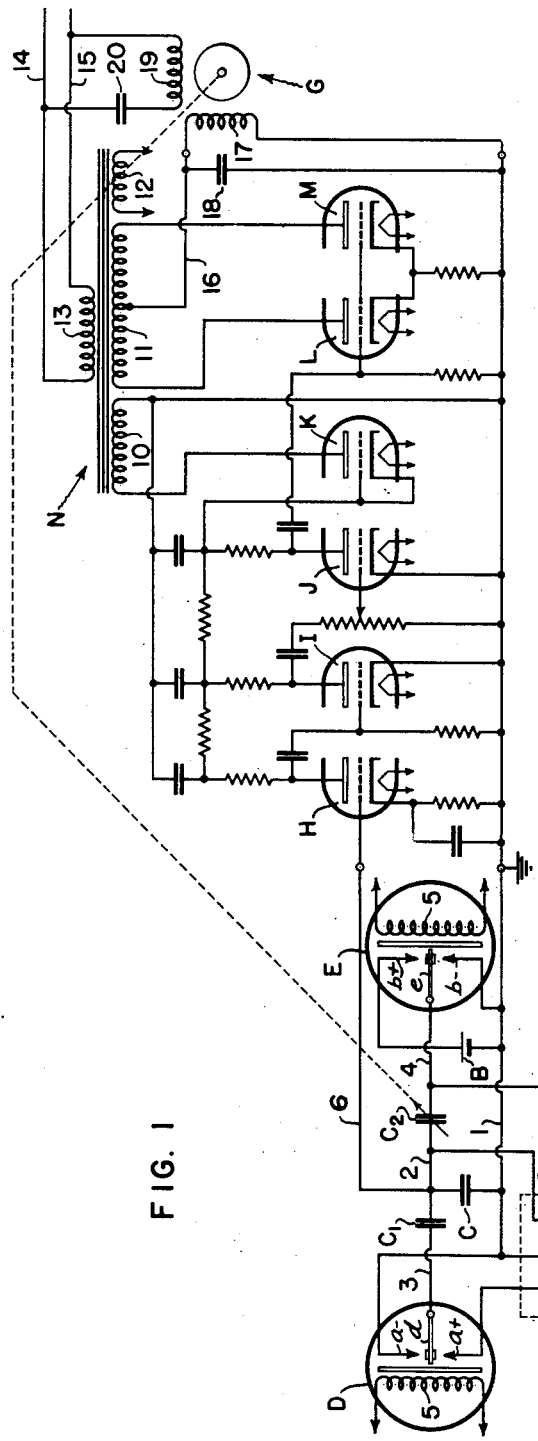
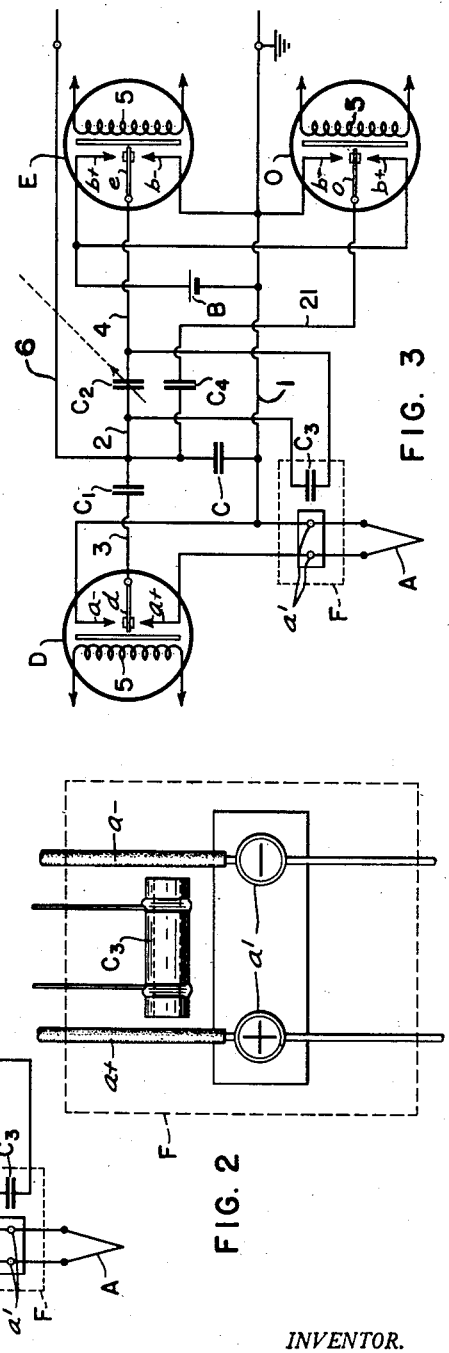
*INVENTOR.*
RUDOLF F. WILD
BY
*Arthur H. Swanson*
ATTORNEY.

Patented June 16, 1953

2,641,931

UNITED STATES PATENT OFFICE 2,641,931

TEMPERATURE MEASURING APPARATUS

Rudolf F. Wild, Wilmington, Del., assignor to Minneapolis-Honeywell Regulator Company, Minneapolis, Minn., a corporation of Delaware Application July 27, 1949, Serial No. 107,016

2 Claims. (Cl. 73—361)

The general object of the present invention is to provide measuring apparatus of the capacity-rebalancing type with improved means for compensating for the disturbing effects on the measurements made of certain measuring apparatus temperature changes. Thus, for example, in measuring the hot junction temperature of a thermocouple with capacity-rebalancing measuring apparatus, use may advantageously be made of the present invention in providing compensation for variations in the thermocouple cold junction temperature.

In capacity-rebalancing measuring circuit networks of the type to which the invention pertains, the voltage of a source of voltage to be measured is periodically compared with the voltage of a standard cell. In effecting the comparison, a vibrator switch mechanism alternately connects the source of voltage to be measured, and the standard cell source of voltage, through first and second capacitors. One of said capacitors is of fixed capacity and the other is adjustable to permit variation of its capacity. When the network is balanced, the product of the voltage to be measured multiplied by the first capacitor capacity is equal to the product of the standard cell voltage multiplied by the second capacitor capacity. When the network is unbalanced, said products are unequal, but can be made equal by a suitable adjustment of the capacity of the adjustable capacitor. When network balance is established, the adjustment position of the adjustable capacitor provides a measure of the voltage to be measured.

In measuring the voltage of a thermocouple by a capacity-rebalancing measuring circuit network, it has been proposed to provide cold junction temperature compensation by impressing on the measuring circuit, in series with the standard voltage, a compensating voltage which varies with changes in the thermocouple cold junction temperature, and which is derived from a circuit including a source of unidirectional voltage, an electronic voltage regulator tube of the gaseous discharge type and a voltage divider arrangement comprising temperature responsive resistors. The accuracy of such a compensating arrangement depends upon the stability of the voltage regulator, and the regulating action of the latter is subject to variations which result in measuring inaccuracies. Moreover, such a compensating arrangement requires a multiplicity of elements and is undesirably complicated.

A specific object of the present invention is to provide a compensating arrangement simpler and less expensive than the arrangement just described, and free from the inherent instability of the latter and capable of equally good temperature compensation results. I have discovered that the last mentioned object may be attained by the addition to the measuring circuit of a single inexpensive temperature responsive capacitor having a suitable temperature coefficient and capacity.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described a preferred embodiment of the invention.

Of the drawings:

Fig. 1 is a diagram illustrating one embodiment of the invention;

Fig. 2 is an elevation on an enlarged scale of a portion of the apparatus shown diagrammatically in Fig. 1; and Fig. 3 is a diagram illustrating a modification of a portion of the apparatus shown in Fig. 1.

In Fig. 1, I have illustrated by way of example, a measuring circuit of the capacity-rebalancing type adapted to continuously measure the voltage of a thermocouple A. In said measuring circuit, the thermocouple A is associated with a standard cell B, a fixed capacitor or condenser $C_1$, a variable capacitor or condenser $C_2$ and vibrator switch mechanisms D and E. In Fig. 1, the negative terminals of the thermocouple A and standard cell B are directly connected by a conductor 1, shown as connected to ground. As shown, one plate of the condenser $C_1$ is connected to one plate of the condenser $C_2$ by a conductor 2. The second plate of the condenser $C_1$ is connected by a conductor 3 to a pivoted contact or reed $d$ forming a part of the vibrator mechanism D. The second plate of the condenser $C_2$ is connected by a conductor 4 to the pivoted contact or reed $e$ of the vibrator mechanism E. The reeds or vibrating contacts $d$ and $e$ are polarized, and each is caused to vibrate, by alternating current flowing through a coil 5 included in the corresponding vibrator D or E, with a frequency depending on the frequency of the current flowing through the corresponding coil 5. In practice, the two coils 5 are connected in parallel to a source of alternating current of conventional frequency, which is usually 60 cycles per second.

The reed $d$ vibrates between, and alternately engages, stationary contacts respectively connected to the positive and negative terminals $a+$ and $a-$, respectively, of the thermocouple A. Similarly, the reed $e$ vibrates between, and alternately engages, stationary contacts respectively connected to the positive and negative terminals $b+$ and $b-$ of the standard cell B. As shown in Fig. 1, the operative relation of each of the reeds $d$ and $e$ and their associated contacts is such that each reed engages the positive terminal of the voltage source with which it is associated during the instants at which the other reed engages the negative terminal of the other voltage source. The conductor 2 and conductor 1 are connected by an impedance, shown as a condenser C, across which a signal voltage is developed when the circuit is unbalanced. The signal so developed is transmitted through the conductor 1 and a conductor 6, connected to the conductor 2, to suitable apparatus for adjusting the variable condenser $C_2$ as required to make its capacity such that the charge thereon will be equal to the charge on the fixed condenser $C_1$.

In accordance with the present invention, I provide suitable compensation for the tendency of variations in the cold junction temperature of the thermocouple A to cause measurement inaccuracies, by combining a compensating condenser $C_3$ with the variable condenser $C_2$ to form a composite capacitor or capacitance having a capacity which increases and decreases as the thermocouple cold junction temperature decreases and increases respectively. In the form of the composite capacitor which I now consider preferable, the capacity of the capacitor $C_2$ does not vary significantly with changes in its temperature but the condenser $C_3$ has a significant temperature coefficient. The condenser $C_3$ is suitably arranged to vary in temperature substantially as the thermocouple cold junction temperature varies. In practice, various expedients may be used to suitably relate the thermocouple cold junction temperature and the temperature of the condenser $C_3$. Ordinarily, and as is diagrammatically indicated, the cold junction ends $a'$ of the elements or legs of the thermocouple A and the condenser $C_3$ are mounted in an enclosure F in which the said cold junction ends $a'$ and the condenser $C_3$ are maintained at approximately the same temperature, which may be subject to rapid and wide variations. Where a higher degree of accuracy of measurement is desired, said cold junction ends $a'$ and the condenser $C_3$ may be buried side by side in the earth at such depth as to keep their temperatures equal and subject to relatively small variations.

As is well known, the voltage of a thermocouple depends upon the difference between the temperatures of the thermocouple hot and cold junctions, and an increase or decrease in the cold junction temperature changes the thermocouple voltage in the same direction as it is changed by a decrease or increase, respectively, in the hot junction temperature. Thus, the compensating effect needed in the circuit arrangement shown in Fig. 1 for perfect compensation is such an increase or decrease in the capacity of the condenser $C_3$, on a decrease or increase, respectively, in the thermocouple cold junction temperature, that the aggregate capacity of the condensers $C_2$ and $C_3$ will so vary in relation to the change in the last mentioned temperature that the charge on said rebalancing capacitor $C_2$ will vary in proportion to the temperature of the thermocouple hot junction. The collective balancing charge on the condensers $C_2$ and $C_3$ will then vary with changes in the thermocouple hot junction temperature, and will not be affected by changes in the thermocouple cold junction temperature.

As is well known, condensers of certain different types have different definite temperature coefficients of capacity, and those skilled in the art can readily select or produce a condenser, for use as the condenser $C_3$ of Fig. 1, which has the capacity and the temperature coefficient required for use in association with the rebalancing condenser $C_2$ to provide the above described compensation for variations in the cold junction temperature of the thermocouple A. For example, as shown in Fig. 2, condenser $C_3$ may be a ceramic condenser of the type used extensively in the electronic art. Obviously, any other type of condenser which exhibits suitable changes in capacity for corresponding temperature changes may be used.

As those skilled in the art will recognize, apparatus of any one of various known types may be actuated to give the condenser $C_2$ the adjustment needed to rebalance the system in response to the unbalance signal developed across the impedance C. As shown by way of example in Fig. 1, the voltage signal developed by the condenser C is impressed on the input circuit of a voltage amplifier and motor drive system of well known type including a reversible rotatable motor G actuated on the development of voltage signal across the impedance C to rotate in the direction required to adjust the condenser $C_2$ in the direction and to the extent required to reestablish the balanced condition of the apparatus.

The voltage amplifying and motor drive system shown in Fig. 1 comprises triodes H, I, and J connected to form a three stage electronic amplifying system of well known type. Anode voltage is supplied to the anodes of the valves H, I, and J by a rectifier including a valve K energized by alternating current supplied by the secondary winding 10 of a transformer N which has other secondary windings 11 and 12. The winding 12 supplies alternating current to the anodes of motor drive valves L and M, and the secondary winding 12 supplies current for energizing the vibrator coils 5 and for heating the cathode heating elements of the various triodes H, I, J, K, L and M. The cathodes of the valves H, I, J, L and M and one terminal of the secondary winding 10 are connected to ground. The rectifier output circuit is connected to the anodes of the valves H, I, and J by a filter system. The transformer N has a primary winding 13 connected across alternating current supply conductors 14 and 15.

The secondary winding 11 has one end terminal connected to the anode of the triode L, and has its other end terminal connected to the anode of the valve M and has a center tap connection 16 connected through the control winding 17 of the motor G and a tuning condenser 18 in parallel with the winding 17 to ground and thereby to the common cathode of the valves L and M. The motor G has a power winding 19 connected in series with a condenser 20 across the supply conductors 14 and 15. The control grids of the motor drive valves L and M are coupled to the output circuit of the third stage amplifier valve J. In normal operation any signal impressed on the control grids of the valves L and M by the valve J will be in phase with the voltage impressed on the anode of the valve L, or will be 180° out of phase with that voltage and in phase with the voltage impressed on the valve M, accordingly as the signal is produced during the first half of an alternating current cycle by one of the vibrators D and E, or is produced by the action of the other vibrator during the second half of the alternating current cycle.

Further description and explanations herein with respect to the motor amplifying and voltage drive mechanisms shown in Fig. 1 seems unnecessary since that apparatus is not claimed as novel herein, and is fully disclosed and claimed in the Wills Patent 2,423,540 of July 8, 1947.

It is believed that the operation of the apparatus will be apparent to those skilled in the art from Figs. 1 and 2 and from the foregoing description. In the balanced condition of the measuring circuit, the charges on the condenser $C_1$ and $C_2$ are equal, and the operation of neither of the vibrators D and E will cause the transmission of an energizing signal to the control grid of the valve H. A change in the thermocouple voltage makes the charges on the condensers $C_1$ and $C_2$ unequal, and this results in the transmission of a signal to the input circuit of the valve H which consists of a series of pulses, alternately of opposite polarity, and is thus an alternating current signal. The phase of that signal with respect to the voltage of the supply conductors 14 and 15 depends on the direction of the thermocouple voltage change, and causes the motor G to rotate in the direction to change the capacity of the condenser $C_2$ as required to make its charge equal to the charge on the condenser $C_1$, and thus rebalance the circuit.

Regardless of what the actual thermocouple voltage at any instant may be, or of the direction in which that voltage may be changing, the tendency of a change in the thermocouple cold junction temperature to vary the relative magnitudes of the charges on the condensers $C_1$ and $C_2$, is neutralized by the effect of said temperature change on the capacity of the temperature responsive condenser $C_3$.

Since the condenser $C_2$ cannot be adjusted to have a capacity which is equal to zero, or is negative, the circuit shown in Fig. 1 cannot be used without modification to measure the voltage of the thermocouple A when the latter voltage diminishes to zero, and cannot be used to measure a negative voltage. In Fig. 3, however, I have illustrated a modification of the circuit arrangement shown in Fig. 1, which is adapted to measure a voltage equal to zero or of negative value, and which retains the temperature compensating characteristics of the Fig. 1 circuit.

In the circuit shown in Fig. 3, I combine a third vibrator O and a fourth condenser $C_4$ with the measuring circuit portion of the circuit arrangement in Fig. 1. The vibrator O may be a counterpart of the vibrators D and E. The vibrating contact or reed $o$ of the vibrator O vibrates between, and alternately engages, stationary contacts connected to the terminals $b+$ and $b-$ of the standard cell B. The contact arrangement of the vibrator O is the reverse of that of the vibrator E, however, in that the contact $o$ engages the minus terminal $b-$ of the standard cell B at each instant at which the reed element $e$ of the vibrator E engages the positive terminal $b+$ of said cell B, and engages the positive terminal $b+$ of the cell B at each instant at which the vibrator contact $e$ engages the negative terminal $b-$ of said cell. The reed or vibrating contact $o$ of the vibrator O is connected to one plate of the condenser $C_4$ by a conductor 21, and the second plate of the condenser $C_4$ is connected to the conductor 2 and thereby to the plate of the condenser $C_2$ which is not directly connected to the vibrating contact $e$ of the vibrator E.

The practical effect of the arrangement shown in Fig. 3 is to so connect the condensers $C_2$ and $C_4$ in series with one another and with the standard cell B when the reeds $e$ and $o$ engage their respectively associated contacts $b+$ and $b-$, that the charge on condenser $C_1$ will be opposed by the difference between the charges of the condensers $C_2$ and $C_4$. When the thermocouple voltage drops to zero and there is no charge on the condenser $C_1$, the balancing adjustment of the condenser $C_2$ will make the charge on that condenser equal to the charge on the condenser $C_4$. When the voltage measured is a negative voltage, the balancing adjustment given the condenser $C_2$ makes the charge on that condenser smaller than the charge on the condenser $C_4$. As will be apparent to those skilled in the art, the compensating condenser $C_3$ will serve the same temperature compensating purpose in the Fig. 3 arrangement, as it serves in the Fig. 1 arrangement.

While, in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without corresponding use of other features.

Having now described my invention, what I claim as new and desire to secure by Letters Patent, is:

1. In a measuring circuit network of the capacitor-rebalancing type, adapted to measure the voltage of a thermocouple subject to separate hot and cold junction temperature variations, and including said thermocouple, a source of constant voltage, a capacitor of fixed capacity, a rebalancing capacitor of adjustable capacity, switching means operative in conjunction with the thermocouple, voltage source, and capacitors to periodically impress a charge proportional to the thermocouple voltage on said fixed and rebalancing capacitors, and means for adjusting said rebalancing capacitor to increase and decrease its capacity as the thermocouple voltage increases and decreases, the improved means for compensating for the changes in the thermocouple voltage due to variations in its cold junction temperature which comprise a compensating capacitor connected in parallel with said rebalancing capacitor, and means for subjecting said compensating capacitor to temperature variations substantially the same as those to which said cold junction is subjected, said compensating capacitor having a temperature coefficient of capacitance such that the aggregate capacity of said compensating and rebalancing capacitors increases and decreases as the temperature of the thermocouple cold junction decreases and increases.

2. In a measuring circuit network of the capacitor-rebalancing type, adapted to measure the voltage of a source of voltage subject to extraneous variations due to variations in the value of a temperature, a source of constant voltage, a capacitor of fixed capacity, a rebalancing capacitor of adjustable capacity, switching means operative in conjunction with the voltage of the first mentioned source, said source of constant voltage, and said capacitors to periodically impress a charge proportional to the voltage of the first mentioned source on said fixed and rebalancing capacitors, and means for adjusting said rebalancing capacitor to increase and decrease its capacity as the voltage of the first mentioned source increases and decreases, the improved means for compensating for the changes in the voltage of the first mentioned source due to variations in the value of said temperature which comprise a compensating capacitor connected in parallel with said rebalancing capacitor, and means for subjecting said compensating capacitor to the variations in the value of said temperature, said compensating capacitor having a temperature coefficient of capacitance such that the aggregate capacity of said compensating and rebalancing capacitors increases and decreases as the value of said temperature varies.

RUDOLF F. WILD.

References Cited in the file of this patent

UNITED STATES PATENTS

| Number | Name | Date |
|---|---|---|
| 1,537,281 | Wunsch | May 12, 1925 |
| 1,617,416 | Pierce | Feb. 15, 1927 |
| 2,011,710 | Davis | Aug. 20, 1935 |
| 2,218,477 | Parker | Oct. 15, 1940 |
| 2,281,461 | Smith | Apr. 28, 1942 |
| 2,453,053 | Wannamaker | Nov. 2, 1948 |
| 2,596,955 | Howe | May 13, 1952 |